F. ROUISS.
STEERING MECHANISM.
APPLICATION FILED JULY 9, 1910.
991,545.
Patented May 9, 1911.
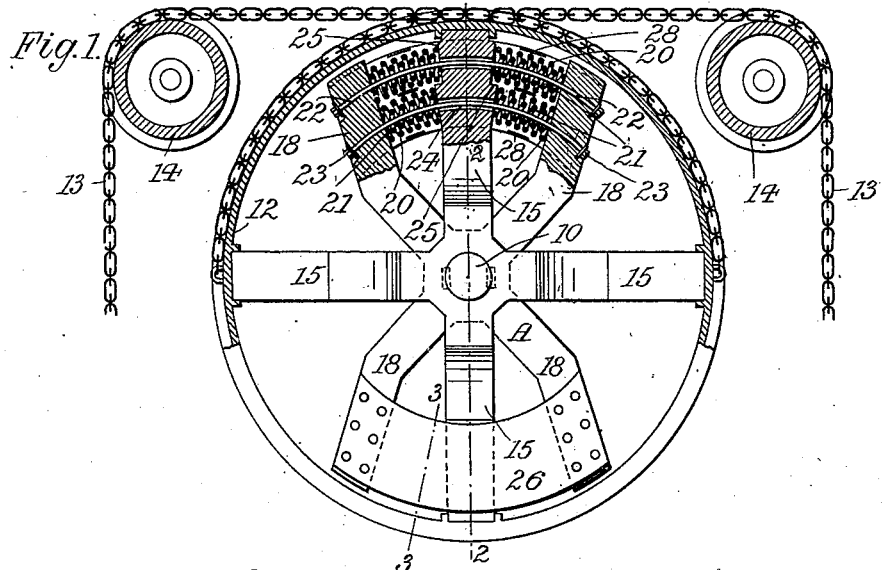
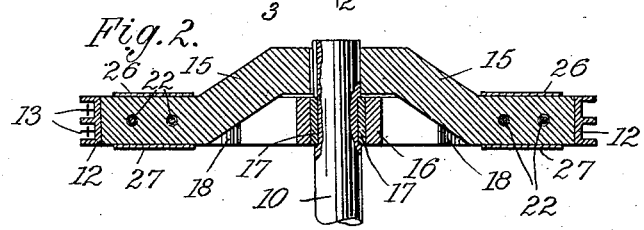
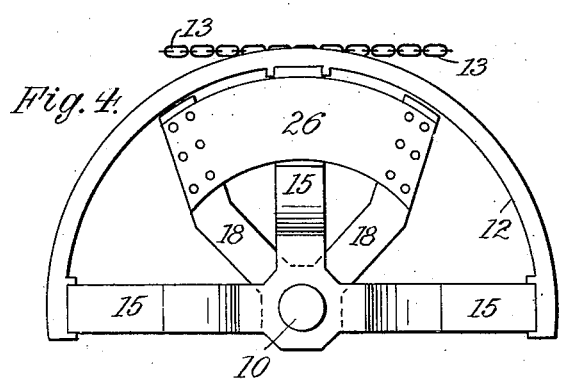
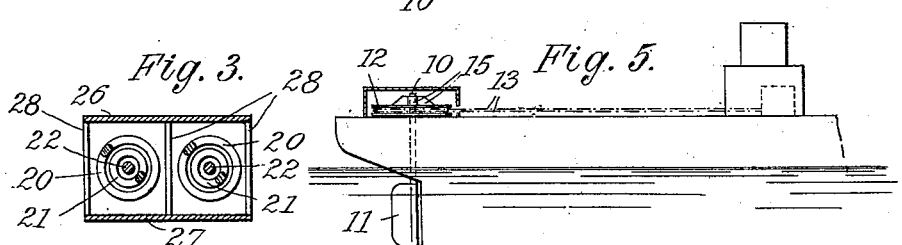
Witnesses:
Katherine Kock
Daniel Holmgren
Inventor
Frederick Rouiss,
By his Attorneys
Briesen & Zump.
THE NORRIS PETERS CO., WASHINGTON, D. C.

UNITED STATES PATENT OFFICE.

FREDERICK ROUISS, OF JERSEY CITY, NEW JERSEY.

STEERING MECHANISM.

991,545. Specification of Letters Patent. Patented May 9, 1911.

Application filed July 9, 1910. Serial No. 571,146.

*To all whom it may concern:*

Be it known that I, FREDERICK ROUISS, a citizen of the United States, residing at Jersey City, county of Hudson, State of New Jersey, have invented new and useful Improvements in Steering Mechanism, of which the following is a specification.

This invention relates to a steering mechanism which is so constructed that any sudden jolts of the rudder blade occasioned by wave motion are not transmitted to the steering gear, but are absorbed by springs interpolated between the blade and said gear.

In the accompanying drawing: Figure 1 is a plan partly in section of a steering mechanism embodying my invention; Fig. 2 a section on line 2—2, Fig. 1; Fig. 3 a section on line 3—3, Fig. 1; Fig. 4 a plan of a modification; and Fig. 5 a diagrammatic view of part of a vessel provided with the steering mechanism.

Upon the post 10, carrying the rudder blade 11, is rotatably mounted a steering member or wheel 12, which by chains 13 running over idlers 14, is operatively connected to suitable steering means. The spokes 15 of wheel 12, are bent upwardly at the center, to provide a socket for the accommodation of the hub 16 of a spider A, keyed to post 10 at 17, and arranged in the same horizontal plane as the body of wheel 12. It will be noted that the socket of the wheel has its walls beveled and that the hub of the spider is correspondingly beveled.

Spider A is provided with two forwardly and two rearwardly projecting arms 18 which diverge outwardly from the hub 16, the two diverging members of each arm pair straddling respectively the forwardly and rearwardly extending spokes 15 of wheel 12, which are normally centered between said arms. Between each set of coöperating arms 18 and the interposed spoke 15, are interpolated one or more sets of springs 20, which should be of such superior strength that they will transmit the steering movement of wheel 12 to spider A, and accordingly to post 10. As shown in the drawing, two sets of coiled springs 20 are arranged at each side of spoke 15 and each spring 20 surrounds a second coiled spring 21 of less diameter, and constituting a reinforcement of spring 20. Axially through each double spring 20, 21 extends a guide rod 22, curved concentrically to post 10, and secured by nuts 23 to arms 18, while it passes loosely through apertures 24 of spoke 15. The two sides of this spoke are stepped as at 25 to form a rectilinear bearing for the inner ends of the springs, the outer ends of which engage the inner sides of arms 18.

Each arm pair 18, is provided with a housing adapted to extend above and below the springs and comprising a top plate 26, and a bottom plate 27, which are bolted to the arms, and are connected to each other by braces 28.

As has been stated, the steering movement of wheel 12, is transmitted by springs 20, 21 to the arms 18 of spider A and thus to the rudder post 10. Any severe shocks imparted to the rudder blade 11, by wave motion will however be absorbed by the springs, which will thus relieve the steering gear, and prevent the same from becoming disabled during high seas or in stormy weather.

With smaller vessels the spider may be provided with a single arm pair 18 straddling a single spoke 15 as illustrated in Fig. 4, in lieu of the double pair shown in Fig. 1.

I claim:

1. A steering mechanism provided with a post, a wheel mounted on the post, and including a hub and spokes, the spokes being bent at their inner ends and having their outer ends arranged in the same horizontal plane as the rim of the wheel, a spider including a hub and pairs of diverging arms that straddle opposite spokes of the wheel, the arms at their inner ends, being beveled to correspond with said inclination at the inner ends of the spokes with the outer ends of the arms from the inclined parts of the spokes lying in the same horizontal plane as the wheel, and cushioning means having engagement with said arms and with the spokes that said arms straddle.

2. A steering mechanism provided with a post, a wheel mounted on the post and including a hub and spokes, the spokes being bent upwardly on an incline at their inner ends and having their outer ends arranged in the same horizontal plane as the wheel, a spider including a hub and a pair of diverging arms that straddle opposite sides of one of said spokes, the arms of the spider being beveled to correspond with the inclination of said hub and spokes and overlapping said inclined portions of the spokes and hub of the wheel with the outer ends of the arms of the spider from the inclined parts of the spokes lying in the same horizontal plane as the wheel, and cushioning means having engagement with said arms and with the spoke that said arms straddle.

FREDERICK ROUISS.

Witnesses:
FRANK V. BRIESEN,
KATHERYNE KOCH.

Copies of this patent may be obtained for five cents each, by addressing the "Commissioner of Patents, Washington, D. C."